P. G. ELGERT & E. FETTERS.
BRAKE ATTACHMENT FOR DUMP WAGONS.
APPLICATION FILED JULY 22, 1915.
1,179,618.
Patented Apr. 18, 1916.
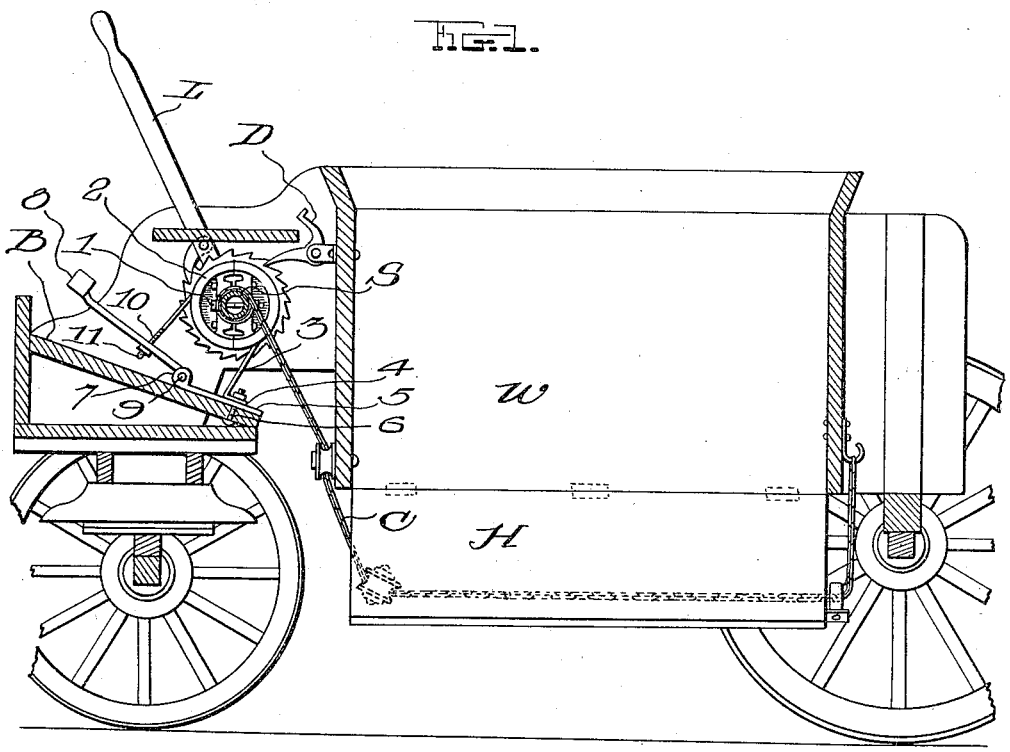
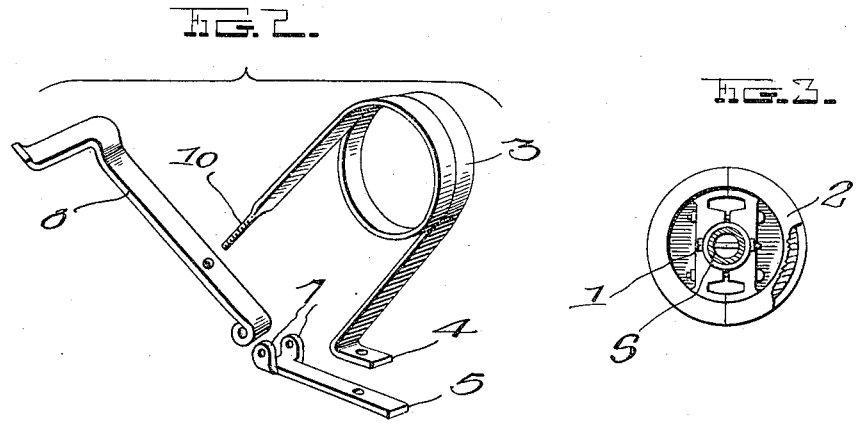
Witnesses
H. Woodard
E. Creevell
Inventors
Philip G. Elgert
& Elmer Fetters
By Harland L. Mossman.
Attorney
THE COLUMBIA PLANOGRAPH CO., WASHINGTON, D. C.

UNITED STATES PATENT OFFICE.

PHILIP G. ELGERT AND ELMER FETTERS, OF OMAHA, NEBRASKA.

BRAKE ATTACHMENT FOR DUMP-WAGONS.

1,179,618.

Specification of Letters Patent. Patented Apr. 18, 1916.

Application filed July 22, 1915. Serial No. 41,350.

*To all whom it may concern:*

Be it known that we, PHILIP G. ELGERT and ELMER FETTERS, citizens of the United States, residing at Omaha, in the county of Douglas and State of Nebraska, have invented certain new and useful Improvements in Brake Attachments for Dump-Wagons; and we do declare the following to be a full, clear, and exact description of the invention, such as will enable others skilled in the art to which it appertains to make and use the same.

Our invention relates to a new and useful attachment for dump wagons of the type having a downwardly swinging bottom formed of two sections held normally raised by the winding of chains upon a shaft at the front of the wagon bed, or by similar means actuated by such a shaft.

The object of the invention is to provide a simply constructed brake for controlling the rotation of the shaft in question, whereby the bottom sections of the wagon bed may be lowered only predetermined amounts, thus allowing the load to be slowly discharged as the wagon is drawn forwardly, this being often very advantageous.

With this general object in view, the invention resides in certain novel features of construction and in unique combinations of parts to be hereinafter fully described and claimed, the descriptive matter being supplemented by the accompanying drawing wherein, Figure 1 is a vertical longitudinal section of a dump wagon showing the application of the invention to use; Fig. 2 is a perspective view of the brake band, the device for anchoring one end thereof, and the foot lever attached to the other end of said band; and Fig. 3 is a detail vertical section through the dumping shaft disclosing a side elevation of the drum thereon.

In this drawing wherein like reference characters designate corresponding parts throughout the several views, W designates broadly a dump wagon whose bottom is composed of downwardly swinging halves H held normally raised by winding of the chains C upon a transverse shaft S which is disposed adjacent the driver's seat and above the inclined foot board B, said shaft being rotated to wind the chains by the ratchet lever L, and being held against retrograde movement by an appropriate manually released dog D. The parts so far briefly described constitute no part of the invention and are simply illustrated for the purpose of disclosing the application of such invention to use.

Clamped by bolts 1 or secured in any other preferred manner to the shaft S near one end thereof, is a sectional peripherally grooved brake drum 2 receiving in its groove an appropriate brake band 3 which is preferably passed one or more times around the drum, said band having at one of its ends an attaching foot 4 provided with an aperture, said foot being disposed in contact with an anchor plate 5 which contacts with the upper side of the inclined foot board B, a single bolt or other appropriate fastener 6, being passed through said board, through the plate 5, and through the foot 4, whereby to rigidly hold said plate in position and at the same time anchor one end of the brake band 3.

The front end of the anchor plate 5 is provided with one or more upstanding ears 7, two being here shown, such ears receiving therebetween an eye on the rear end of an inclined foot lever 8, a bolt, rivet or the like 9 being passed through said ears and through the eye whereby to fulcrum the lever for vertical movement. The lever 8 is provided intermediate its ends with an opening through which the bolt 10 carried by the other end of the brake band 3 is passed, said bolt having threaded thereon a nut 11, adjustment of which will raise or lower the lever 8 to the desired angle.

In operation, the shaft S may be released to allow the bottom halves H to descend a predetermined amount, whereupon the foot lever 8 is forced forwardly by the driver to suspend rotation of said shaft, thus allowing the load to be slowly dumped when the wagon is driven forwardly. As is well known, this manner of dumping is essential in a number of cases.

It is to be observed that the invention is extremely simple and inexpensive, and that but one bolt is required for the attachment thereof to the foot board of the wagon. Obviously, this foot board need not be inclined and in fact the anchor plate 5 might well be secured to some other appropriate fixed member. In most cases, however, it is secured to the foot board to render it easily accessible.

In the drawings, the invention is shown as applied to one type of dumping wagon, for illustrative purposes only, it being understood that it is applicable to any one of a number of types of such wagons employing a rotatable shaft for raising and lowering its bottom, whether the latter be formed in halves as above described, or in a single unit. Regardless of the type of wagon on which the invention is used, and the specific location of the anchor plate 5, the device will be highly efficient and durable and will fulfil a need which is gradually becoming more and more apparent.

We claim:—

1. Brake means for application to the dumping shafts of dump wagons, comprising a brake drum for application to such shafts, a brake band passed around said drum and having at one end an attaching foot, an anchor member with which said foot contacts, a bolt passing through said anchor member and the foot and designed to be likewise passed through a fixed part of the wagon to secure the anchor member thereto, an ear on the anchor member, a lever connected with the other end of the brake band and having at one end an eye disposed adjacent the ear, and a fulcrum passed through said ear and through the eye.

2. Brake means for application to the dumping shafts of dump wagons, comprising a brake drum for application to such shafts, a brake band passed around said drum and having at one end an attaching plate, an anchor plate with which said foot contacts, an attaching bolt passing through said plate and the foot and adapted to be likewise passed through the fixed part of the wagon to secure the anchor plate thereto, a pair of spaced ears formed on one end of said plate, a lever having connection with the other end of the brake band and having at one of its ends an eye interposed between the ears, and a fulcrum passed through said ears and the eye.

In testimony whereof we have hereunto set our hands in presence of two subscribing witnesses.

PHILIP G. ELGERT.
ELMER FETTERS.

Witnesses:
H. L. MOSSMAN,
N. B. RICH.

Copies of this patent may be obtained for five cents each, by addressing the "Commissioner of Patents, Washington, D. C."